(12) United States Patent
Ericsson

(10) Patent No.: US 11,513,137 B2
(45) Date of Patent: Nov. 29, 2022

(54) DEVICE FOR MEASURING TWO PHYSICAL QUANTITIES

(71) Applicant: AKTIEBOLAGET SKF, Gothenburg (SE)

(72) Inventor: Anders Ericsson, Piteå (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/128,755

(22) Filed: Dec. 21, 2020

(65) Prior Publication Data
US 2021/0263065 A1   Aug. 26, 2021

(30) Foreign Application Priority Data
Feb. 20, 2020   (DE) .......................... 102020202224.0

(51) Int. Cl.
*G01P 15/08*   (2006.01)
*G01K 7/16*   (2006.01)

(52) U.S. Cl.
CPC ................ *G01P 15/08* (2013.01); *G01K 7/16* (2013.01)

(58) Field of Classification Search
None
See application file for complete search history.

(56) References Cited

U.S. PATENT DOCUMENTS

| | | | | |
|---|---|---|---|---|
| 3,695,112 A | * | 10/1972 | Possell | G01K 7/20 374/173 |
| 5,111,692 A | * | 5/1992 | McQueen | G01F 23/247 73/204.17 |
| 2003/0132734 A1 | * | 7/2003 | Gibbs | G01K 7/16 374/E7.018 |
| 2008/0012557 A1 | * | 1/2008 | Hammerschmidt | G01D 5/142 324/252 |
| 2012/0130196 A1 | * | 5/2012 | Jain | A61B 5/45 600/300 |
| 2014/0252960 A1 | * | 9/2014 | Waser | H05B 45/18 315/297 |
| 2019/0051498 A1 | * | 2/2019 | Kim | H01J 37/32339 |

FOREIGN PATENT DOCUMENTS

| | | | | |
|---|---|---|---|---|
| PL | 225429 B1 | * | 4/2017 | .......... G01R 31/027 |
| WO | WO-2012135683 A1 | * | 10/2012 | ............. C04B 35/45 |

OTHER PUBLICATIONS

Gorecki, English translation of Polish Patent Publication # PL 225429, Method and system for measuring self- and mutual—thermal resistance of a choke, 2014 (Year: 2014).*

* cited by examiner

*Primary Examiner* — Raul J Rios Russo
*Assistant Examiner* — Carl F. R. Tchatchouang
(74) *Attorney, Agent, or Firm* — J-Tek Law PLLC; Scott T. Wakeman; Mark A. Ussai

(57) ABSTRACT

A device for measuring at least one physical quantity includes a direct voltage source and a measuring sensor coupled to the voltage source, which sensor is configured to measure a physical quantity. A current regulator is connected between the direct voltage source and the measuring sensor, and a voltmeter is connected in parallel with the measuring sensor so that a voltage detected by the voltmeter is indicative of the measured quantity.

16 Claims, 3 Drawing Sheets

DEVICE FOR MEASURING TWO PHYSICAL QUANTITIES

CROSS-REFERENCE

This application claims priority to German patent application no. 10 2020 202 224.0 filed on Feb. 20, 2020, the contents of which are fully incorporated herein by reference.

TECHNOLOGICAL FIELD

The present disclosure is directed to devices for measuring physical quantities and to electronic components of such devices.

BACKGROUND

A sensor is a device that transforms the state of an observed physical quantity into a usable one, such as an electrical voltage or current.

One examiner of a sensor is an accelerometer, which, when attached to a moving object, can measure the linear acceleration of that object.

Piezoelectric accelerometers, for example, have the property of becoming electrically charged when subjected to deformation.

As the piezoelectric phenomenon works in both directions, accelerometers also deform when they are electrically charged which allows an electrical voltage proportional to the acceleration to be collected.

Today, such an accelerometer may have dimensions of only a few millimeters or even less, so that it can be integrated directly on an electronic card or circuit board or even in the chip of a computer and thus not take up a significant amount of space or require specific connectors.

Other types of sensors such as a resistance temperature detectors are also known. These sensors can be configured to measure a temperature usually using a typical resistance value of 1000 ohm at 0° C.

The current flowing through the resistor generates a voltage to be measured to determine the temperature. It is based on the fact that the electrical resistance of platinum varies with temperature.

In contrast to the accelerometer, which is usually supplied with a constant current with a wide typical tolerance of ±20%, the resistance temperature detector must be supplied with a constant, direct current with an accuracy tolerance of typical 0.2% or less in order to deliver accurate temperature values.

In order to supply an accelerometer and a resistance temperature sensor, a solution was to add components to the circuit such as switches in order to select the sensor to be supplied, according to the delivered current.

This solution also requires an addition of programmed modules to control these components and thus the selection between the accelerometer and the resistance temperature detector.

The measuring device is then cluttered with complex circuitry in order to carry out the measures.

SUMMARY

One aspect of the present disclosure is to measure at least one physical quantity such as temperature or acceleration without cluttering up the measuring device.

For this purpose, a first aspect of the disclosure comprises a method for measuring at least one physical quantity comprising a supply of at least one measuring sensor configured to measure a physical quantity, by a direct voltage and a current regulation configured to supply the sensor with a constant direct current.

Thanks to the invention, it is now possible to replace one measuring sensor by another one without adding components.

As a matter of fact, each sensor can deliver accurate values when it's powered by the constant direct current.

Thus, there is no need to add electronics to select the sensor to power.

In one embodiment, the regulated current has a precision tolerance of less than or equal to 0.2%.

By this way, any sensor may be implemented without cluttering up the circuit with switches for example.

In one embodiment, the physical quantity is a temperature or an acceleration.

According to another aspect, the invention further comprises a device for measuring at least one physical quantity, comprising at least one direct voltage source generator, at least one measuring sensor coupled to said voltage source generator, configured to measure a physical quantity, and a regulator coupled to the sensor and configured to generate a constant direct current.

In one embodiment, the current regulator has a precision tolerance of less than or equal to 0.2%.

In one embodiment, the physical quantity is a temperature or an acceleration.

According to an embodiment, the temperature sensor is a resistance temperature detector.

Another aspect of the disclosure comprises a method that includes providing a sensor configured to sense a physical condition, connecting a direct voltage source to the sensor, connecting a current regulator between the direct voltage source and the sensor, and connecting a voltmeter in parallel with the sensor to determine a voltage indicative of the physical condition sensed by the sensor.

A further aspect of the disclosure comprises a device for measuring at least one physical quantity that includes a direct voltage source and a measuring sensor coupled to the voltage source, the measuring sensor being configured to measure a physical quantity. The device also includes a current regulator connected between the direct voltage source and the measuring sensor and a voltmeter connected in parallel with the measuring sensor. A voltage detected by the voltmeter is indicative of the measured quantity.

Another aspect of the disclosure comprises a circuit that includes a DC voltage source having an input and an output, the voltage source being configured to produce a voltage output signal from the output. The circuit also includes a current regulator having an input and an output, the current regulator input being configured to receive the voltage output signal and the current regulator being configured to produce a current output signal from the current regulator output. The circuit also includes a sensor having a first connection and a second connection, the first connection being configured to receive the current output signal from the current regulator, an d the second connection being connected to the input of the DC voltage source. A voltmeter is connected to the first connection and the second connection and is configured to detect a voltage across the sensor, where the detected voltage is indicative of an acceleration when the sensor is an accelerometer and the detected voltage is indicative of a temperature when the sensor is a resistance temperature detector.

The invention further comprises an integrated circuit comprising a measuring device as defined above.

BRIEF DESCRIPTION OF THE DRAWINGS

The present invention and its advantages will be better understood by studying the detailed description of a specific embodiment given by way of a non-limiting example and illustrated by the appended drawings in which.

DETAILED DESCRIPTION

Figure 1A:
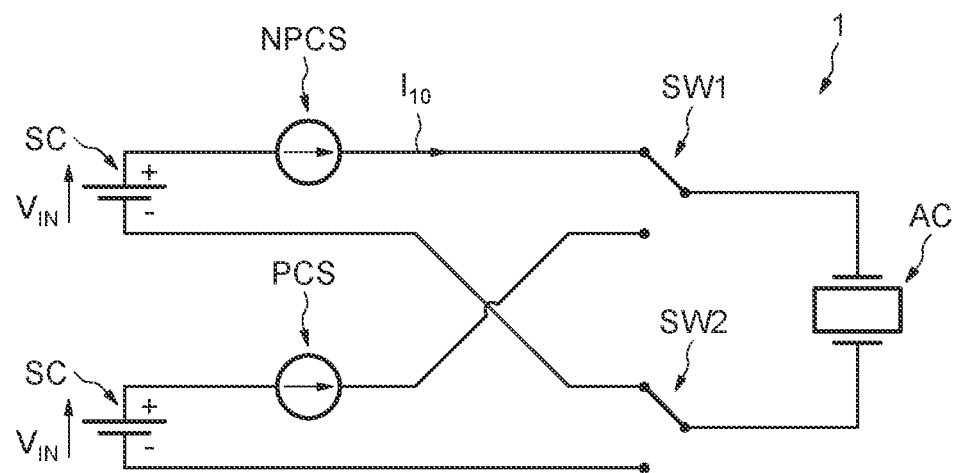
FIGS. 1A and 1B illustrate a conventional measuring device.
Figure 1B:
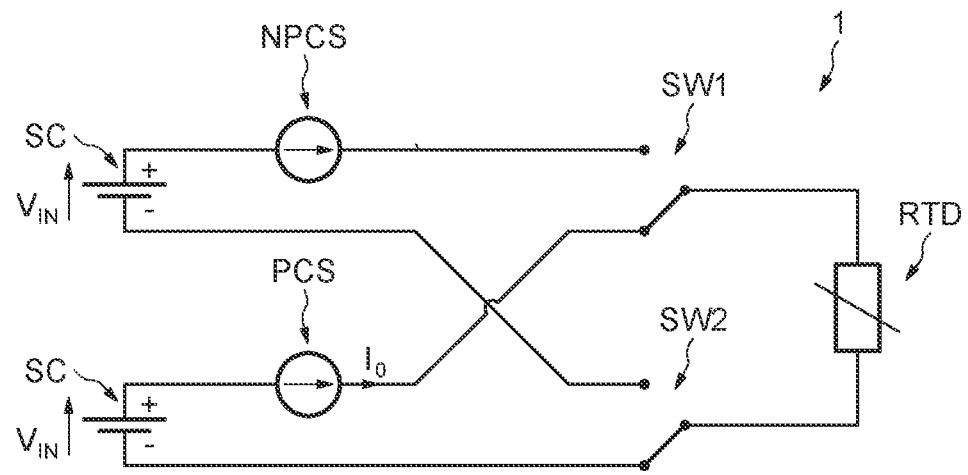

FIGS. 1A and 1B show a measuring device 1 configured to measure two physical quantities such as temperature and acceleration.

In order to collect temperature data, the measuring device 1 of FIG. 1B includes a resistance temperature detector RTD with a typical resistance of 1000 ohm at 0° C. that is suitable for receiving a current with a precision tolerance of less than or equal to 0.2% to deliver accurate temperature values.

Of course, the resistance temperature detector may be replaced by any temperature sensor with the same tolerance interval.

To measure the acceleration, the measuring device 1 of FIG. 1A includes an accelerometer AC of conventional structure which may be supplied with a constant current with a wide tolerance of ±20%.

The resistance temperature detector RTD and the accelerometer AC are powered by a direct voltage source generator SC such as a battery, which delivers an electrical voltage $V_{IN}$.

The generator SC is coupled to a current regulator PCS configured to deliver a constant direct current $I_0$ and to a non-precision current generator NPCS configured to deliver a non-constant direct current $I_{10}$.

In particular, the current regulator PCS is coupled to the resistance temperature detector RTD and the non-constant direct current NPCS is coupled to the accelerometer AC.

As the current regulator PCS has a precision tolerance of 0.2% in this example, it allows the resistance temperature detector RTD to be operational.

The connections are here established by two switches SW1 and SW2 wherein switch SW1 is configured to enable or disable the flow of current $I_{10}$ from the non-constant direct current NPCS to power the accelerometer AC.

Similarly, switch SW2 is configured to enable or disable the flow of current $I_0$ from the current regulator PCS to power the resistance temperature detector RTD.

As switches SW1 and SW2 are configured to select the sensor to be supplied according to the delivered current, this embodiment requires an addition of programmed modules to control switches SW1, SW2 and thus the selection between the accelerometer AC and the resistance temperature detector RTD.

Figure 2A:
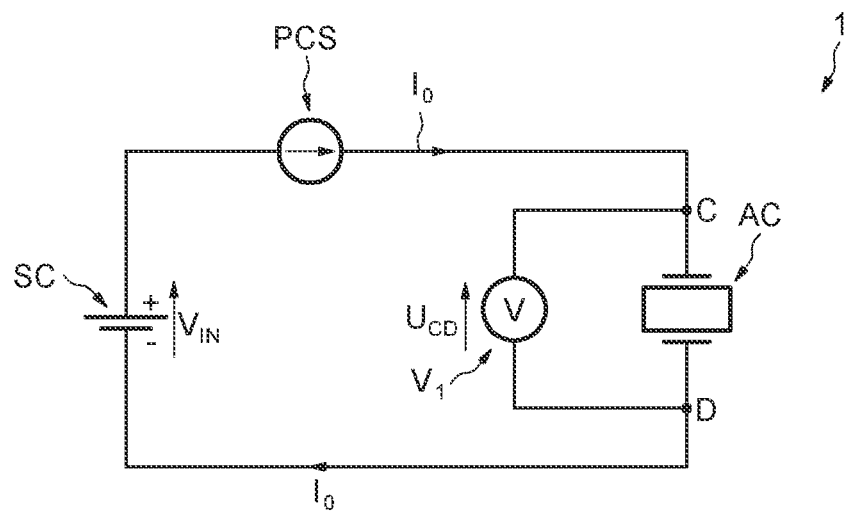
FIGS. 2A and 2B schematically illustrate a measuring device according to a first and a second embodiment of the invention.
Figure 2B:
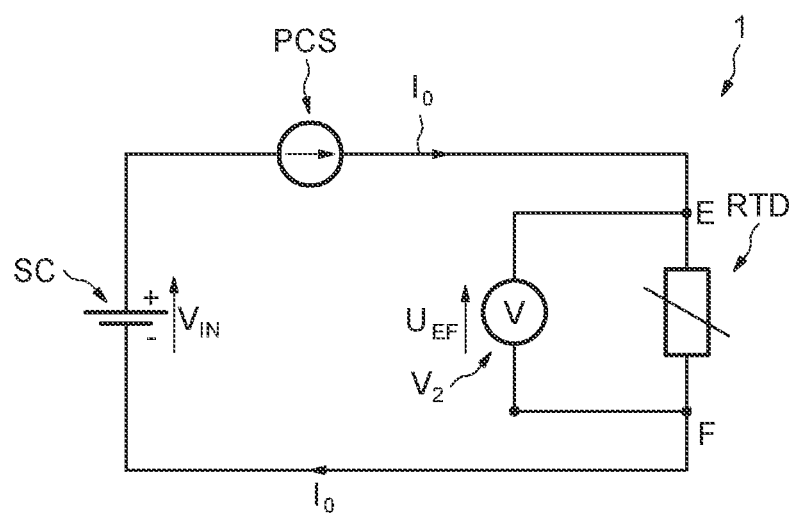

In order to overcome the use of these components, FIGS. 2A and 2B illustrate only one current regulator PCS which can be coupled to the accelerometer AC or to the resistance temperature detector RTD.

To read the acceleration, the accelerometer AC is coupled in parallel, at nodes C and D, to a first voltmeter V1 configured to measure a voltage $U_{CD}$ at its terminals as shown in FIG. 2A.

As for the acceleration reading, the resistance temperature detector is coupled in parallel, at nodes E and F, to a second voltmeter V2 configured to measure a voltage $U_{EF}$ at its terminals as illustrated in FIG. 2B.

Figure 3:
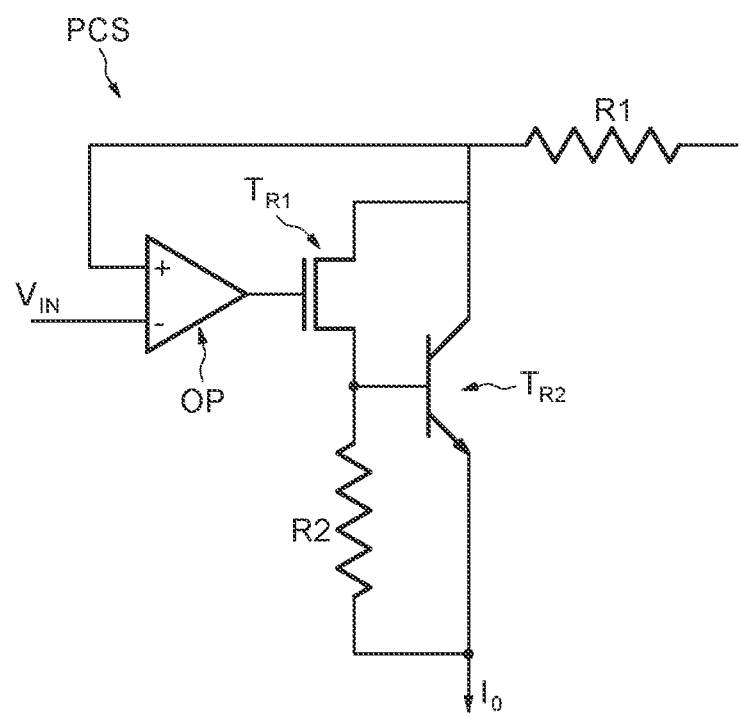
FIG. 3 is a schematic representation of a current regulator of the measuring device of FIG. 2.

FIG. 3 shows a schematic representation of the PCS current controller with conventional circuitry that may be used in the measuring device. Alternatively, other types of PCS current controller may be used.

The current regulator PCS includes here an electronic amplifier OP which receives as an input the voltage $V_{IN}$, delivered by the source generator SC.

The amplifier OP is configured to output a control voltage to drive a field effect transistor $T_{R1}$ which is coupled to a bipolar transistor $T_{R2}$.

The transistor $T_{R1}$ is here configured to drive the bipolar transistor in order to output the regulated current $I_0$ that will power the accelerometer AC and the resistance temperature detector RTD.

Furthermore, it should be noted that the gain of the amplifier OP depends on the parameters of the transistors $T_{R1}$, $R_{R2}$ and the resistors R1 and R2.

The invention is not limited to these embodiments but comprises all the variants. For example, other components may be connected between the accelerometer AC or the resistance temperature detector RTD as long as they do not influence the accuracy of the regulated current $I_0$.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved devices for measuring two physical quantities.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method comprising:
    providing a first sensor configured to sense a first physical condition,
    connecting a direct voltage source to the first sensor,
    connecting a current regulator between the direct voltage source and the first sensor,
    connecting a voltmeter in parallel with the first sensor, and
    determining a magnitude of the first physical condition from the voltage sensed by the voltmeter;

wherein the first sensor comprises an accelerometer and the voltage is indicative of an acceleration, or wherein the first sensor comprises a resistance temperature detector and the voltage is indicative of a temperature.

2. The method according to claim 1, wherein the current regulator has a precision tolerance of less than or equal to 0.2%.

3. The method according to claim 1, wherein the current regulator has a precision tolerance of less than or equal to 0.2%.

4. The method according to claim 3, wherein the physical condition is a temperature or an acceleration.

5. The method according to claim 1, wherein the physical condition is an acceleration.

6. The method according to claim 1, further including:
providing a second sensor configured to sense a second physical condition,
disconnecting the first sensor from the voltmeter,
connecting the second sensor in parallel with the voltmeter, and
determining a magnitude of the second physical condition from the voltage sensed by the voltmeter.

7. The method according to claim 6, wherein the first sensor is a resistance temperature detector and the second sensor is an accelerometer.

8. The method according to claim 1, wherein the physical condition is a temperature or an acceleration.

9. A device for measuring at least one physical quantity, comprising:
a direct voltage source,
a measuring sensor coupled to the voltage source, the measuring sensor being configured to measure a physical quantity,
a current regulator connected between the direct voltage source and the measuring sensor, and
a voltmeter connected in parallel with the measuring sensor, wherein a voltage detected by the voltmeter is indicative of the measured quantity;
wherein the measuring sensor comprises an accelerometer and the voltage is indicative of an acceleration, or wherein the measuring sensor comprises a resistance temperature detector and the voltage is indicative of a temperature.

10. The device according to claim 9, wherein the current regulator has a precision tolerance of less than or equal to 0.2%.

11. The device according to claim 9, wherein the current regulator has a precision tolerance of less than or equal to 0.2%.

12. The device according to claim 11, wherein the physical quantity is a temperature or an acceleration.

13. An integrated circuit comprising a measuring device according to claim 9.

14. The device according to claim 9, wherein the physical quantity is an acceleration.

15. The device according to claim 9, wherein the physical quantity is a temperature or an acceleration.

16. A circuit comprising:
a DC voltage source having an input and an output, the voltage source being configured to produce a voltage output signal from the output,
a current regulator having an input and an output, the current regulator input being configured to receive the voltage output signal and the current regulator being configured to produce a current output signal from the current regulator output,
a sensor having a first connection and a second connection, the first connection being configured to receive the current output signal from the current regulator, and the second connection being connected to the input of the DC voltage source,
a voltmeter connected to the first connection and the second connection and configured to detect a voltage across the sensor,
wherein the sensor is an accelerometer and the detected voltage is indicative of an acceleration, or the sensor is a resistance temperature detector and the detected voltage is indicative of a temperature.

* * * * *